United States Patent
Weber

(10) Patent No.: US 6,690,919 B1
(45) Date of Patent: Feb. 10, 2004

(54) DETERMINING THE QUALITY OF TELECOMMUNICATION SERVICES

(75) Inventor: Bernhard Weber, Düsseldorf (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/674,786

(22) PCT Filed: May 4, 1999

(86) PCT No.: PCT/DE99/01383

§ 371 (c)(1),
(2), (4) Date: Nov. 6, 2000

(87) PCT Pub. No.: WO99/57823

PCT Pub. Date: Nov. 11, 1999

(30) Foreign Application Priority Data

May 5, 1998  (DE) .......................................... 198 20 845

(51) Int. Cl.[7] ........................... H04B 7/00; H04B 17/00; H04M 3/42
(52) U.S. Cl. ..................... 455/67.1; 455/67.6; 455/414; 455/423; 455/226.1
(58) Field of Search ............................... 455/67.1, 67.3, 455/67.7, 226.1, 226.2, 423, 414, 403, 425; 379/1.01, 10.01, 32.01, 32.04

(56) References Cited

U.S. PATENT DOCUMENTS

| 5,940,471 | A | * | 8/1999 | Homayoun | ............... 379/10.03 |
| 6,088,588 | A | * | 7/2000 | Osborne | ..................... 455/425 |
| 6,347,217 | B1 | * | 2/2002 | Bengtsson et al. | ......... 455/67.7 |

* cited by examiner

Primary Examiner—Nay Maung
Assistant Examiner—Edan Orgad
(74) Attorney, Agent, or Firm—Cohen, Pontani, Lieberman & Pavane

(57) ABSTRACT

A method for ascertaining the quality of service of telecommunication services in a communication network is provided including assessing subjectively obtained quality of service parameters, transmitting the quality of service data to a central station in the communication network and inputting the quality of service data into a terminal. The inputting step is performed by a terminal user. Quality of service parameters may include a network accessibility of the communication network, a service accessibility of a selected service, a speech quality and a probability of call termination. The assessment step is performed for each instance of a service being used and/or each attempt at using a service on a terminal designed for communication in the communication network.

22 Claims, 1 Drawing Sheet

DETERMINING THE QUALITY OF TELECOMMUNICATION SERVICES

REFERENCE TO RELATED APPLICATIONS

The present application is a National Phase application based on PCT/DE99/01383, filed on May 4, 1999. Priority claimed on that application and on foreign application no. 198 20 845.6, filed in Germany on May 5, 1998.

BACKGROUND INVENTION

1. Field of the Invention

The invention relates to a method for ascertaining the quality of service of telecommunication services in a communication network.

Such a communication network is, in particular, a telecommunication network, for example a landline network and/or a mobile radio network.

2. Description of the Related Art

The quality of service is a common, abstract term combining parameters, phenomena, effects, impressions etc. which (generally together) determine the degree of satisfaction of a telecommunication service customer in a communication network.

The quality of service is affected by objective and subjective parameters. For the (subjectively) experienced quality of service to be ascertained by the operator of a communication network, it is possible to ascertain the quality of service experienced from test customers, who use and assess the services. The disadvantages of this are that, for a reasonable outlay, the assessment is generally not carried out for individual instances of a service being used which are paid for by the customer, but instead is carried out in and all inclusive fashion. The behavior and the assessment of the test customers is only conditionally representative of the cross section of customers for a communication network operator and require a relatively high outlay to obtain statistically significant data.

The quality of service experienced may also be determined by customer surveys, in which case the recording of individual instances of a service being used which are paid for by the customer is likewise not assessed, the outlay for implementation is likewise relatively high, and, moreover, there is the risk that customer satisfaction will be adversely affected by the survey.

SUMMARY OF THE INVENTION

The object of the present invention is the provision of methods and apparatuses which permits a meaningful quality of service assessment for telecommunication services in a communication network as easily, efficiently and economically as possible.

The invention avoids the disadvantages of the above known methods for determining the "quality of service experienced". Recording the quality of service at the terminal end allows a very meaningful assessment of the quality of service available at the terminal end, and hence to the customer. This permits systematic errors during recording of the quality of service to be prevented. In addition, it permits a comprehensive picture of the "quality of service experienced" (subjectively) by customers and of the "quality of service ascertained" (which is measured at the terminal end), which is more accurate than a spot check or a customer survey. In addition, quality of service can be monitored in a manner which is both continuous and has universal coverage. Systematic errors when the quality of service is recorded are ruled out if the "quality of service ascertained" (at the terminal end) and the "quality of service experienced" (subjectively by the terminal user) are recorded at the terminal end.

To ascertain the quality of service, two fundamental embodiments of the present invention are provided, which may also be combined.

In a further embodiments of the present invention in accordance with the quality of service can be input on the terminal by the terminal user to record the quality of service. For this purpose, the terminal can poll the quality of service from the user in a prescribed form (for example in a menu item and/or using selection keys etc.).

The quality of service which is input by the terminal user is called the "quality of service experienced" below and is the quality of service which is actually subjectively perceived by the customer when using a telecommunication service in the communication network.

In this embodiment of the invention, the central station (of the service provider or communication network operator) receives a meaningful statement about the degree of a customer's satisfaction with the particular instance of use of an individual service. Polling the customer's subjective impressions achieves a high level of meaningfulness for the quality of service experienced. The service provider (which may be the provider of an individual service or may be the communication network operator) receives a comprehensive picture of the quality of service subjectively experienced by a customer, which is much more meaningful than spot checks or customer surveys. In addition, the quality of service experienced can be assessed in a manner which is continuous and has universal coverage. The highly differentiated statements about the "quality of service experienced" which is determined on the basis of this embodiment of the present invention permit the service provider to react to discrepancies in the desired customer satisfaction in good time using highly differentiated measures, which prevents customers from being so dissatisfied that they communicate their dissatisfaction to further potential customers, terminate their customer association or complain.

When selecting a service provider's measures when inadequate "quality of service experienced" has been established, a comparison of the "quality of service experienced" with the quality of service (described below) ascertained may be helpful for the selection of suitable measures, possibly also in conjunction with empirical values.

Since the "quality of service experienced" is recorded using the same equipment as also provides the service, there is no need for any additional quality of service assessment equipment, which means that the quality of service experienced can be recorded much more economically according to the invention than with other solutions.

A further fundamental embodiment of the invention (in particular in accordance with claim 18) relates to recording quality of service data at the terminal end by virtue of terminals themselves and/or components of the communication network recording the quality of service data, that is to say recording is carried out without any intervention from the terminal user. In this refinement of relates to recorded objectively, which permits an objective quality of service assessment for individual communication services in the telecommunication network as an alternative or in addition to the (subjectively) experienced quality of service. This permits quality of service features which have a technical basis to be distinguished from quality of service features which do not have a technical basis; those variables affecting customer satisfaction which do not have a technical basis include, by way of example, friendliness during personal contact with customers or, inter alia, expectations affected by fashion trends. Hence, the recording of quality of service data in this embodiment permits causal technical interrelations to be clarified, and hence permits optimized assessment of possible technical approaches to solutions. Ascertaining the quality of service for individual instances of use of a service on the basis of definable criteria provides the service provider with clear and complete information about the quality of service of telecommunication services actually provided for the customer. This allows targeted analysis and elimination of weaknesses with a minimal time delay and differently selectable depth of detail (regional, local, customer-specific etc.). This means that suitable, targeted technical measures can be implemented in the communication network. In addition, the objective checking of the quality of service ascertained of this embodiment permits comprehensible checking of the quality of telecommunication services which is actually achieved, and hence a checkable guarantee of service level agreements; this means that tariffs can also be structured depending on the (objectively comprehensible) quality of service, that is to say can be related to the actual quality of service in an objectively suitable manner. By virtue of the "quality of service ascertained" being recorded in the terminal itself and/or in components of the communication network, no additional quality of service data recording equipment is necessary, which means that such quality of service data recording is very economical. Recorded quality of service data can relate, in particular, to one or more of the following quality of service parameters: network accessibility, service accessibility, speech quality, call termination probability, and, in the case of data services, effective transmission speed and bit error rate etc.

On the hardware side, the invention can be implemented in terminals and communication networks.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims. It should be further noted that the drawings are merely intended to conceptually illustrate the structures and procedures described herein.

BRIEF DESCRIPTION OF THE DRAWINGS

Further features and advantages of the invention can be found in the of the drawing which is schematic form of the drawings in which.

Figure 1:
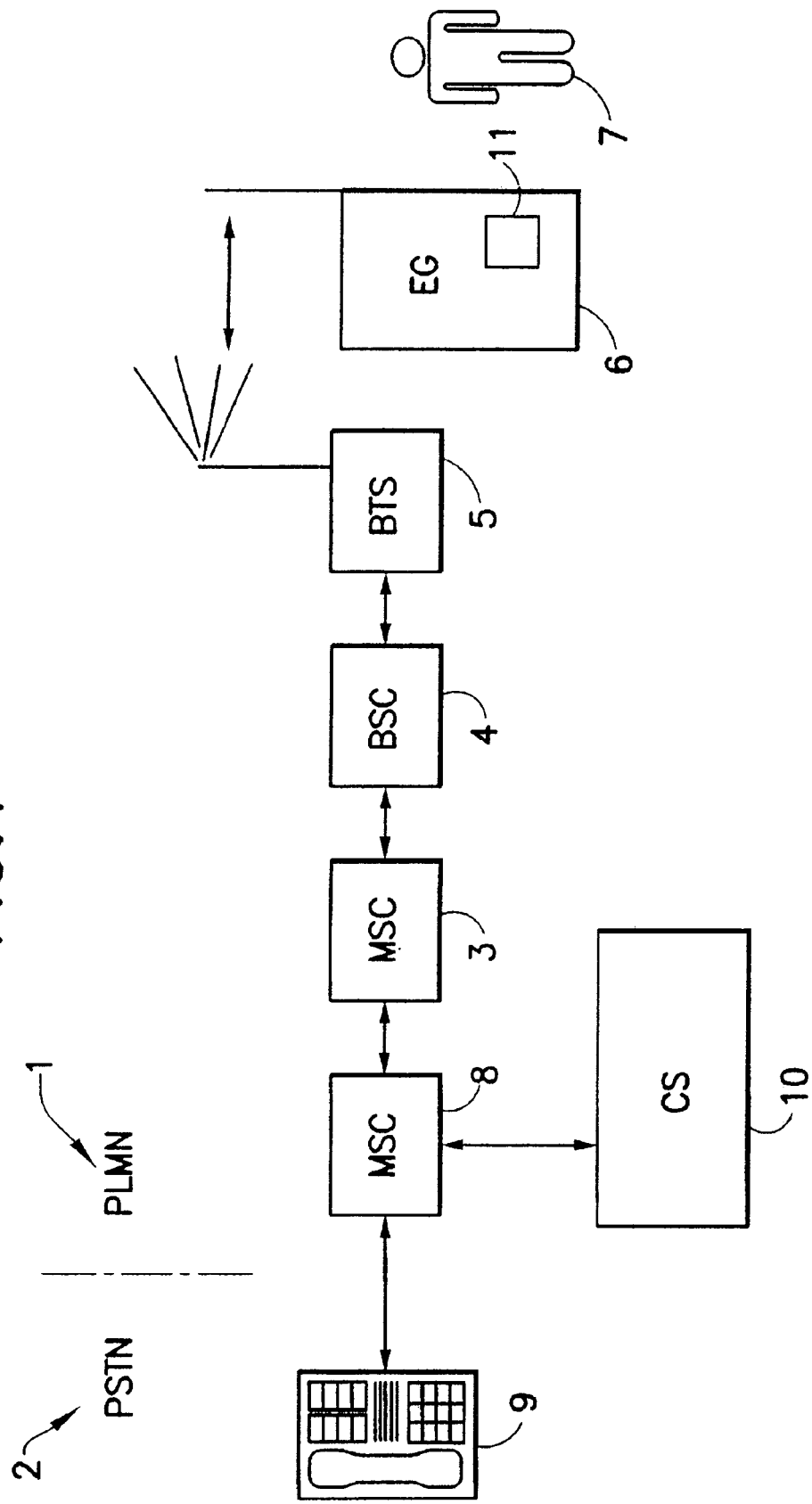
FIG. 1 is an overview of Relevain Part network.

The excerpt from a communication network in FIG. 1 comprises a mobile radio network 1 (for example a GSM network) and a landline network 2.

Amongst the (incomplete) elements of the mobile radio network 1 which are shown by way of example, the MSC 3 is a mobile services switching center, that is to say a switching center for a mobile radio network, the BSC 4 is a base station controller, the BTS 5 is a base transceiver station and the EG 6 is a terminal used by a terminal user 7. A connection passes from the mobile radio network 1 via an MSC 8 (gateway MSC etc.) to a further terminal 9 in a landline network 2 (PSTN) via the landline network. Quality of service data can be recorded and ascertained in the landline network 2 and in the mobile radio network 1. On account of the transmission problems related to radio transmission, monitoring is of particular importance for the mobile radio network.

The quality of service which is ascertained (on the basis of objective technical criteria) and/or (subjectively) experienced (and input manually) may, in particular, relate to the quality of a conversation between two terminals 6, 9, none, one or both of which may be connected in a mobile radio network and, accordingly, both, one or none of which may be connected in a landline network.

The "quality of service experienced" can be communicated by a terminal user 7 to a quality of service checking center 10 (called "central station" below for), for example by specifying one or more of the quality of service parameters such as network accessibility, service accessibility, speech quality, call termination probability.

In this context, network accessibility covers, by way of example, the terminal user's (subjective) assessment of the temporal and/or spatial homogeneity of the provision of the telephone service by the service provider; in a mobile radio network having a radio interface, the network accessibility is determined essentially by the quality of the radio coverage.

The service accessibility relates to the customer's (subjective) satisfaction with the setup of a telephone link requested by him.

The speech quality represents the (subjective) assessment of the quality of the transmitted speech in terms of clarity, speaker recognition, noise, etc.

The call termination probability represents the (subjective) satisfaction of the terminal user 7 with the probability of unwanted instances of a call being terminated.

The above parameters (network accessibility, service accessibility, speech quality, call termination probability) for the quality of service are explained by way of example for recording of the quality of service (that is to say for the subjective assessment of the quality of service by a key input, audio input etc. from a customer on the terminal). As an alternative or in addition, the above parameters (network accessibility, service accessibility, speech quality, call termination probability) may also be (objectively) recorded individually or in combination by the terminal and/or other network components. This enables a (by way of example, additional) technical assessment criterion to be provided for the quality of service. The assessment criterion, alone or in combination with the above (subjective) quality of service parameters experienced, optimizes selection of suitable measures in the network (such as the provision of more channels, higher transmission powers, additional BTSs etc.).

Besides the above parameters which, in particular, relate to the quality of voice telecommunication services in a communication network, the (subjective) quality of service experienced and the (technically objectively) "ascertained quality of service" may also be determined in relation to data services (alphanumeric services etc.); in this case, in particular, the effective transmission speed and the bit error rate can be determined, in particular (objectively) ascertained.

In the present example in FIG. 1, the (subjectively) "experienced" quality of service (input by keypad, audio input etc.) and/or the (technically objectively) "ascertained quality of service" can be determined on the terminal 6 and/or on the terminal 9.

To ascertain the "quality of service experienced", a key 11, for example, may be provided on the terminal 6, said key 11 permitting binary input of dissatisfaction with a service. Furthermore, an input quantized on a greater than binary basis may also be performed, e.g. by pressing a numerical key after the key 11, by inputting in a menu etc. The "ascertained quality of service" is, on the other hand, an assessment of the quality of service by the terminal and/or other network elements (1, 2, 3, 4, 5 etc.) relating to objective parameters, such as call termination statistics, bit error rate etc.

The "quality of service experienced" (input, for example, audibly or using a key 11) and/or the "quality of service ascertained" at the terminal end may be transmitted from a terminal to a central station 10 via a wide variety of communication channels. In particular, signaling channels, possibly even signaling channels designed specifically for this purpose, may be used for this purpose. By way of example, a short message (e.g. GSM-SMS) may be sent from the terminal to a central station 10.

"Quality of service experienced" and/or "quality of service ascertained" data can be processed further in a central station 10. In particular, the "quality of service experienced" and the "quality of service ascertained" (if they have not already been combined at the terminal end) can be combined and jointly evaluated in the central station 10 in relation to a telecommunication service procedure. Quality of service data for a user may also be combined. In addition, quality of service data relating to particular transmission paths and/or transmission elements in the communication network can be combined in order to be able to assess the need for network measures (higher transmission power, additional BTSs, additional channels, etc.).

An instance of a service being used may, by way of example, be a telephone conversation, retrieval of information, etc. An attempt at using a service may, by way of example, be a (successful or unsuccessful) telephone call which has been attempted (by dialing a telephone number etc.), an attempt to register a mobile telephone 6 in a mobile radio network, etc.

Thus, while there has been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for recording a quality of service of a telecommunication service in a communication network, comprising the steps of:
   assessing at least one quality of service parameter including a network accessibility of the communication network, a service accessibility of a selected service, a speech quality and a probability of call termination, the assessment step being performed for at least one of each of said at least one quality of service parameter being used and each attempt at using a service on a terminal designed for communication in the communication network;
   transmitting a quality of service data representing the quality of service parameter to a central station in the communication network; and
   inputting the quality of service data into a terminal, the inputting step being performed by a terminal user.

2. The method according to claim 1, wherein the communication network is a mobile radio network and the terminal is a mobile radio.

3. The method according to claim 1, wherein the service is a telephone conversation over the communication network.

4. The method according to claim 1, wherein the transmitting step includes transmitting the quality of service data via a special communication channel.

5. The method according to claim 1, wherein the transmitting step includes transmitting the quality of service data via short message.

6. The method according to claim 5, wherein the short message is GSM-SMS.

7. The method as claimed in claim 1, further comprising the steps of:
   recording the quality of service data in the central station; and
   evaluating the quality of service data in the central station.

8. The method according to claim 1, further comprising the step of:
   quantizing the quality of service data on one of a binary basis and a greater than binary basis.

9. The method according to claim 1, further comprising the step of:
   compiling in t he central station the quality of service data relating to one terminal.

10. The method according to claim 1, further comprising the step of:
    evaluating the quality of service data, wherein all of the quality of service data pertaining to a particular part of the communication network are evaluated together.

11. The method according to claim 1, further comprising the step of:
    storing the quality of service data in one of the terminal and the communication network when transmission to the central station is not possible due to a communications fault; and then
    transmitting the stored data once transmission to the central station is again possible.

12. The method according to claim 1, further comprising the step of:
    polling the quality of service data which has been ascertained from at least one of the terminal and the central station.

13. The method according to claim 1, further comprising the step of:
    polling a derivative data based on the quality of service which has been ascertained from at least one of the terminal and the central station.

14. The method according to claim 12, further comprising the step of:
    recording quality of service data at a terminal end using at least one of the terminal and components of the computer network so as to ascertain the quality of service on a technically objective basis.

15. The method according to claim 14, wherein said recording step includes recording quality of service data while the terminal is communicating over the communication network.

16. The method according to claim 1, further comprising the step of:

transmitting the quality of service data after a communication instance.

17. The method according to claim 1, further comprising the step of:

processing the quality of service data together with billing data.

18. The method according to claim 1, further comprising the step of:

billing telecommunication charges by accounting for one of the quality of service data and data derived from the quality of service data.

19. A terminal for communication in a communication network, comprising:

a program means for performing the steps of:
- a) assessing at least one subjective quality of service parameter including a network accessibility of the communication network, a service accessibility of a selected service, a speech quality and a probability of call termination, the assessment being performed for at least one of each of said at least one subjective quality of service parameter being used and each attempt at using a service on a terminal designed for communication in the communication network;
- b) transmitting a quality of service data representing the quality of service parameter to a central station in the communication network; and
- c) inputting the subjectively ascertained quality of service data into the terminal, the inputting step being performed by a terminal user;

a memory for the computer program product; and a processor for processing the computer program product.

20. The terminal according to claim 19, wherein the terminal is a mobile radio unit.

21. The terminal according to claim 20, wherein the mobile radio unit is a GSM.

22. The terminal according to claim 19, wherein the processor comprises a designated key for inputting the quality of service data.

\* \* \* \* \*